United States Patent
Yu et al.

(10) Patent No.: US 11,508,120 B2
(45) Date of Patent: Nov. 22, 2022

(54) METHODS AND APPARATUS TO GENERATE A THREE-DIMENSIONAL (3D) MODEL FOR 3D SCENE RECONSTRUCTION

(71) Applicant: Intel Corporation, Santa Clara, CA (US)

(72) Inventors: Chong Yu, Shanghai (CN); Yun Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/957,696

(22) PCT Filed: Mar. 8, 2018

(86) PCT No.: PCT/CN2018/078396
§ 371 (c)(1),
(2) Date: Jun. 24, 2020

(87) PCT Pub. No.: WO2019/169594
PCT Pub. Date: Sep. 12, 2019

(65) Prior Publication Data
US 2020/0364928 A1 Nov. 19, 2020

(51) Int. Cl.
*G06T 17/00* (2006.01)
*G06T 7/70* (2017.01)
*G06T 7/00* (2017.01)

(52) U.S. Cl.
CPC ............ *G06T 17/00* (2013.01); *G06T 7/0002* (2013.01); *G06T 7/70* (2017.01); *G06T 7/97* (2017.01);
(Continued)

(58) Field of Classification Search
CPC .. G06T 17/00; G06T 7/97; G06T 7/70; G06T 7/002
(Continued)

(56) References Cited

U.S. PATENT DOCUMENTS

2004/0155877 A1* 8/2004 Hong ...................... G06T 17/00
345/419
2012/0114251 A1 5/2012 Solem et al.
(Continued)

FOREIGN PATENT DOCUMENTS

CN 107154023 9/2017
CN 107239766 10/2017

OTHER PUBLICATIONS

International Searching Authority, "Search Report," issued in connection with International Patent Application No. PCT/CN2018/078396, dated Sep. 13, 2018, 5 pages.
(Continued)

*Primary Examiner* — Hai Tao Sun
(74) *Attorney, Agent, or Firm* — Hanley, Flight & Zimmerman, LLC (57) ABSTRACT

Methods, apparatus, systems and articles of manufacture for generating a three-dimensional (3D) model for 3D scene reconstruction are disclosed. An example apparatus includes a 3D scene generator to generate a 3D model for digital image scene reconstruction based on a trained generative model and a digital image captured in a real environment. An image simulator is to generate a simulated image based on the 3D model, the simulated image corresponding to the captured image. A discriminator is to apply a discriminative model to the simulated image to determine whether the simulated image is simulated.

24 Claims, 5 Drawing Sheets

(52) U.S. Cl.
CPC ............... *G06T 2207/20081* (2013.01); *G06T 2207/30168* (2013.01); *G06T 2207/30244* (2013.01); *G06T 2210/61* (2013.01)

(58) Field of Classification Search
USPC ........................................................ 345/420
See application file for complete search history.

(56) References Cited

U.S. PATENT DOCUMENTS

| | | | |
|---|---|---|---|
| 2013/0181989 A1* | 7/2013 | Agarwal ................ | G06T 17/00 345/420 |
| 2016/0283833 A1* | 9/2016 | Peek ....................... | H04N 1/46 |
| 2017/0004649 A1* | 1/2017 | Collet Romea ......... | G06T 17/00 |
| 2018/0028294 A1* | 2/2018 | Azernikov ........... | G06K 9/6274 |
| 2019/0096035 A1* | 3/2019 | Li ........................ | G06T 3/4053 |

OTHER PUBLICATIONS

International Searching Authority, "Written Opinion," issued in connection with International Patent Application No. PCT/CN2018/078396, dated Sep. 19, 2018, 4 pages.

Wang, "Advances in generative adversarial network," Journal on Communications, No. 2, vol. 39, Feb. 25, 2018, 14 pages (English Abstract).

\* cited by examiner

METHODS AND APPARATUS TO GENERATE A THREE-DIMENSIONAL (3D) MODEL FOR 3D SCENE RECONSTRUCTION

FIELD OF THE DISCLOSURE

This disclosure relates generally to machine vision, and, more particularly, to methods and apparatus to generate a three-dimensional (3D) model for 3D scene reconstruction.

BACKGROUND

In recent years, three-dimensional (3D) reconstruction has been a research topic in advanced computer graphics and computer vision. 3D reconstruction enables 3D models to be created from two dimensional images. 3D reconstruction has benefits in many different fields such as, for example, surveying, mapping, medical imaging, 3D printing, virtual reality, robotics, etc.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Different approaches exist for creation of a 3D model based on real-world images of a scene. For example, Structure from Motion (SFM), multi-view stereo (MVS), Red Green Blue Distance (RGB-D), Shape Prior based reconstruction, Generative-Adversarial based reconstruction, etc. However, many of those approaches have drawbacks (e.g., extensive input requirements, output limitations, etc.). Example approaches disclosed herein address those drawbacks using a semi-supervised framework with generative adversarial networks for 3D scene reconstruction.

Example approaches disclosed herein, while generating a 3D model, attempt to discriminate between real images of the location being modeled and corresponding simulated images created using the 3D model. Using example approaches disclosed herein, if the real and simulated images are not distinguishable from each other (e.g., an observer cannot differentiate the artificially generated 3D scene from the real 3D scene), then the 3D model is considered complete.

Example approaches disclosed herein utilize a difference between simulated 2D scene image(s) from the reconstructed 3D scene and observed 2D image(s) from the real scene. If the difference between the reconstructed and observed 2D images is sufficiently small, the 3D model is considered successfully created for a high-quality 3D reconstruction result.

Example approaches disclosed herein use a generative adversarial network (GAN) including a generative model and a discriminative model. The generative model is used to generate a 3D model that is intended to be very similar (i.e., not differentiable from) the real-world location being reconstructed. The discriminative model is used to classify samples synthesized based on the 3D model created by the generative model and real corresponding images. In examples disclosed herein, the discriminative model is used to estimate a probability that a specific sample is real or synthesized. Training of the generative model and the discriminative model is performed until the generative model can be used to generate a 3D model that is indistinguishable from the real location by the discriminative model. That is, according to examples disclosed herein, when a Nash Equilibrium is reached, the generative model can reconstruct 3D scene that matches the real 3D scene.

Figure 1:
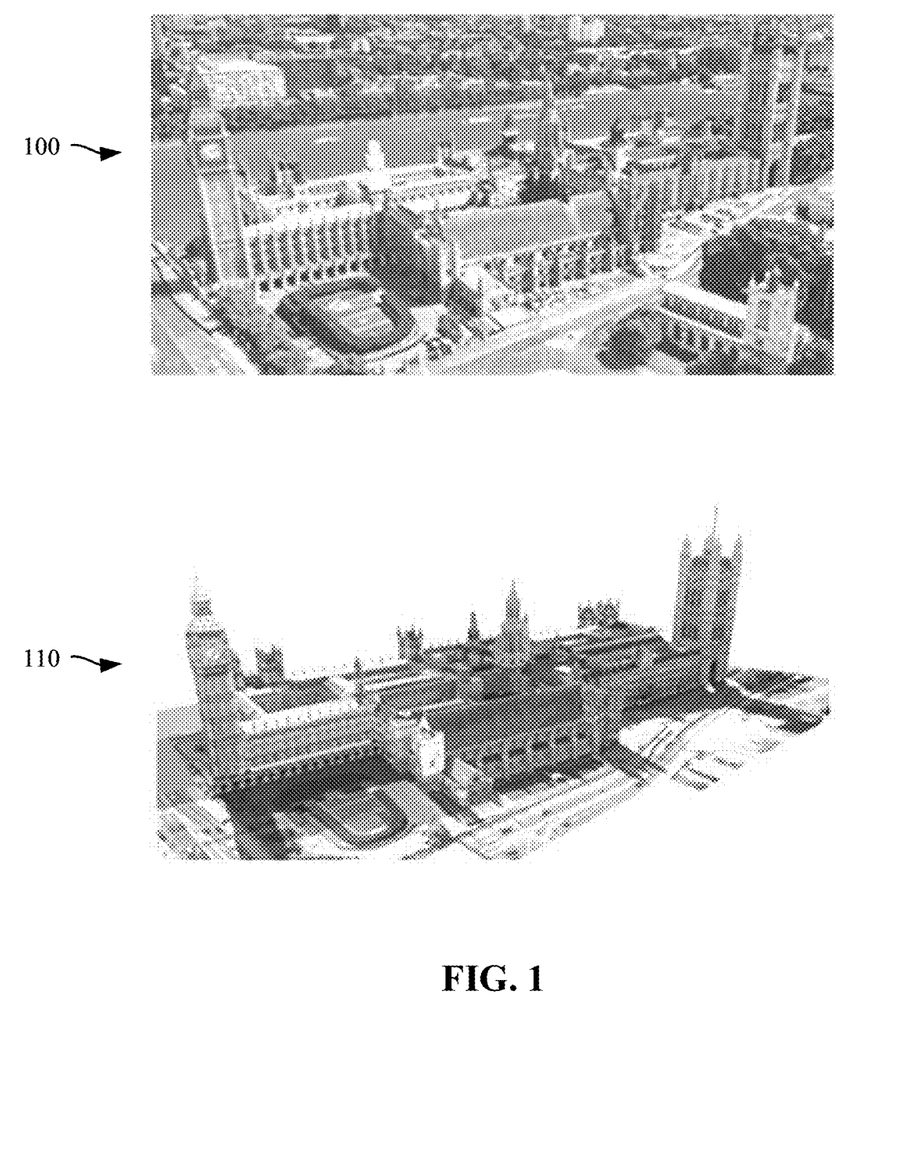
FIG. 1 shows an example image of a geographic location and a simulated image constructed in accordance with teachings of this disclosure.

FIG. 1 shows an example image 100 of a geographic location and a simulated image 110 constructed in accordance with teachings of this disclosure. In the illustrated example of FIG. 1, real-life image 100 depicts a 3D scene of a building. While in the illustrated example of FIG. 1 a building is shown, any other 3D scene may be used in connection with the approaches disclosed herein such as, for example, buildings, vehicles, roads, trees, people, animals, etc. The example simulated image 110 is a digital reconstruction of the scene depicted in the real-life image 100. In examples disclosed herein, the simulated image 110 is generated from a 3D model constructed using the generative model. Using example approaches disclosed herein, the real-life image 100 and the simulated image 110 are processed by the discriminative model to attempt to discern which of the images are simulated or real (without a priori knowledge of whether the image is simulated or real). Example approaches disclosed herein train the generative and discriminative models to the point where the discriminative model cannot distinguish real images from simulated images generated based on the generative model.

Figure 2:
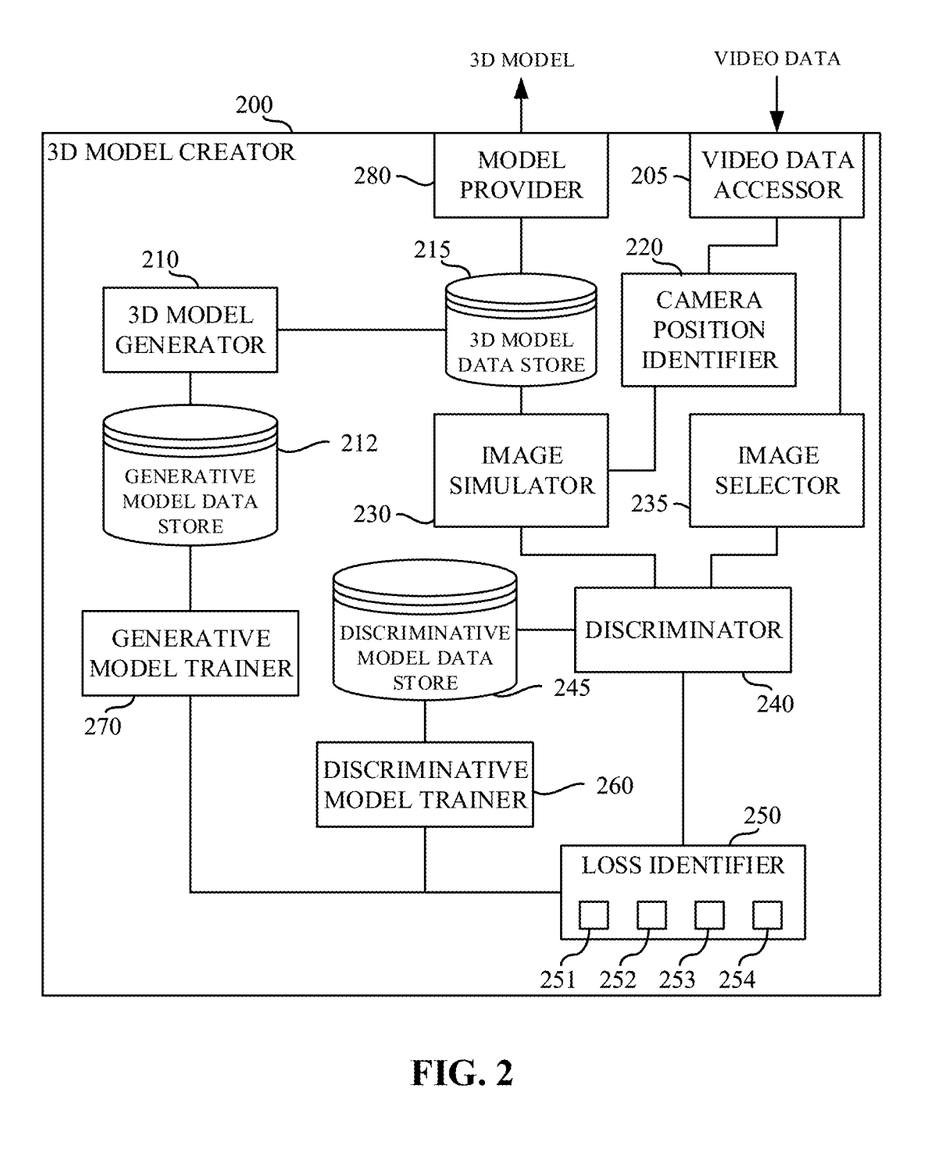
FIG. 2 is a block diagram representing an example 3D model creator in accordance with teachings of this disclosure.

FIG. 2 is a block diagram representing an example 3D model creator 200 in accordance with teachings of this disclosure. The example 3D model creator 200 of the illustrated example of FIG. 2 includes a video data accessor 205, a 3D model generator 210, a generative model data store 212, a 3D model data store 215, a camera position identifier 220, an image simulator 230, an image selector 235, a discriminator 240, a discriminative model data store 245, a loss identifier 250, a discriminative model trainer 260, a generative model trainer 270, and a model provider 280. In examples disclosed herein, the example loss identifier 250 implements a Peak Signal to Noise Ratio identifier 251, a structural similarity identifier 252, a normalized correlation identifier 253, and a cross-entropy calculator 254.

The example video data accessor 205 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example video data accessor 205 accesses video data of a real-world scene. In some examples, the video data is captured using a hardware sensor, such as an image sensor.

In examples disclosed herein, the real-world scene may include any items and/or objects such as, for example, buildings, vehicles, roads, trees, people, animals, etc. In examples disclosed herein, the video data accessor 205 provides the video data to the 3D model generator 210. However, in some examples, the video data accessor 205 stores the video data in a memory of the example 3D model creator 200 (e.g., in the 3D model data store 205).

The example 3D model generator 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example 3D model generator 210 generates a 3D model based on the video data provided by the video data accessor 205 and a generative model stored in the example generative model data store 212. In examples disclosed herein, the example 3D model generator 210 stores the 3D model in the 3D model data store 215. From the 3D model data store 215, the 3D model can be used by the example image simulator 230 and/or be provided to an external entity (e.g., a remote server, a user, a storage device, etc.) by the model provider 280.

The example generative model data store 212 of the illustrated example of FIG. 2 is implemented by any memory, storage device and/or storage disc for storing data such as, for example, flash memory, magnetic media, optical media, etc. Furthermore, the data stored in the example generative model data store 212 may be in any data format such as, for example, binary data, comma delimited data, tab delimited data, structured query language (SQL) structures, etc. While in the illustrated example the generative model data store 212 is illustrated as a single element, the example generative model data store 212 and/or any other data storage elements described herein may be implemented by any number and/or type(s) of memories. In the illustrated example of FIG. 2, the generative model data store 212 stores a generative model used by the 3D scene generator to create the 3D model stored in the 3D model data store. In examples disclosed herein, the generative model represents a deep neural network (DNN). However, any other past, present, and/or future machine learning topology(ies) and/or architecture(s) may additionally or alternatively be used such as, for example, a convolutional neural network (CNN), a feed-forward neural network, a support vector machine (SVM), etc.

The example 3D model data store 215 of the illustrated example of FIG. 2 is implemented by any memory, storage device and/or storage disc for storing data such as, for example, flash memory, magnetic media, optical media, etc. Furthermore, the data stored in the example 3D model data store 215 may be in any data format such as, for example, binary data, comma delimited data, tab delimited data, structured query language (SQL) structures, etc. While in the illustrated example 3D model data store 215 is illustrated as a single element, the example 3D model data store 215 and/or any other data storage elements described herein may be implemented by any number and/or type(s) of memories. In the illustrated example of FIG. 2, the 3D model data store 215 stores a 3D model that is created and/or updated by the 3D model generator 210 based on a generative model stored in the example generative model data store 212 and data accessed by the video data accessor 205. In some examples the 3D model is provided to and/or made accessible to an external entity (e.g., a remote server, a user, a storage device, etc.) by the model provider 280.

The example camera position identifier 220 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. As noted below, the example image selector 235 selects 2D images from the video data that are to be used to evaluate the 3D model. In examples disclosed herein, each frame of video data is selected. However, in some examples, fewer than all of the frames may be selected. The example camera position identifier 220 identifies positions and/or other parameters of the selected 2D image(s). In examples disclosed herein, the example camera position identifier 220 utilizes a trajectory of the hardware camera used to capture the video and/or images to identify the position of the camera for the selected 2D images(s). In some examples, the example camera position identifier 220 parses metadata included in the video data to identify the position of the camera and/or optical characteristics of the images in the video (e.g., focal length, field of view, white balance, etc.). In examples disclosed herein, the positions and/or other parameters are provided to the image simulator 230.

The example image simulator 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example image simulator 230 implements a virtual camera that is movable within the 3D model and can be controlled to match the optical parameters of the camera used to capture the real-world images. Using the position and parameter(s) identified by the camera position identifier 220, the example image simulator 230 simulates 2D image(s) from the 3D model stored in the 3D model data store 215.

The example image selector 235 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example image selector 235 selects 2D images from the video data that are to be used to evaluate the 3D model. In examples disclosed herein, the video data may be captured by a drone and/or other camera platform as it moves about the object(s) to be modeled. In examples disclosed herein, each frame of the video data is selected as an image. However, in some examples, fewer than all of the frames may be selected. For example, if the video data were to include thirty-six hundred frames (e.g., a video lasting one minute captured at sixty frames per second), every sixtieth frame may be selected, resulting in sixty images being selected. As noted above, corresponding images (e.g., sixty images) are created by the image simulator 230 and are passed to the example discriminator 240 for evaluation of the quality of the model as compared to the real world.

The example discriminator 240 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example discriminator 240 utilizes the discriminative model stored in the discriminative model data store 245 to classify each of the simulated 2D images and the selected 2D images as either real or simulated. Such classification can later be compared against the truth (e.g., which images are simulated and which images are real) to quantify an amount of error in the 3D model used to generate the simulated images. In examples disclosed herein, the discriminator 240 provides a probability that a given image is real or simulated. When the probability for an image is both 50% simulated and 50% real, the discriminator is not able to discern whether a given image is real or simulated. In some examples, such classification can later be compared against the truth (e.g., which images are simulated and which images are real) to quantify an amount of error in the 3D model used to generate the simulated images.

The example discriminative model data store 245 of the illustrated example of FIG. 2 is implemented by any memory, storage device and/or storage disc for storing data such as, for example, flash memory, magnetic media, optical media, etc. Furthermore, the data stored in the example discriminative model data store 245 may be in any data format such as, for example, binary data, comma delimited data, tab delimited data, structured query language (SQL) structures, etc. While in the illustrated example discriminative model data store 245 is illustrated as a single element, the example discriminative model data store 245 and/or any other data storage elements described herein may be implemented by any number and/or type(s) of memories. In the illustrated example of FIG. 2, the example discriminative model data store 245 stores the discriminative model used by the discriminator 240 to classify images as real or simulated. In examples disclosed herein, the discriminative model represents a deep neural network (DNN). However, any other past, present, and/or future machine learning topology(ies) and/or architecture(s) may additionally or alternatively be used such as, for example, a convolutional neural network (CNN), a feed-forward neural network, a support vector machine (SVM), etc.

The example loss identifier 250 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In examples disclosed herein, the example loss identifier 250 implements the example Peak Signal to Noise Ratio identifier 251, the example structural similarity identifier 252, the example normalized correlation identifier 253, and the example cross-entropy calculator 254. However, in some examples, the example Peak Signal to Noise Ratio identifier 251, the example structural similarity identifier 252, the example normalized correlation identifier 253, and the example cross-entropy calculator 254 may be implemented separately.

Using the results of the discriminator 240 and/or differences identified between the simulated and real images, the example loss identifier 250 determines an amount of loss (e.g., error). In examples disclosed herein, the overall loss function includes two components: a scene reconstruction loss $L_{Reconstruction}$ and a cross-entropy loss $L_{CrossEntropy}$. The scene reconstruction loss quantifies differences between the simulated and real image pairs provided to the discriminator 240. The cross-entropy loss quantifies an amount of error in the discriminator 240 (e.g., whether the discriminator 240 is able to differentiate between the simulated images and the real images).

Using a scene reconstruction loss in the determination of the total loss ensures that an untrained discriminative model (e.g., a discriminative model that has only undergone a few training iterations) does not inadvertently identify a 3D model as being of high quality (low discrimination error). In examples disclosed herein, the scene reconstruction loss is computed based on a peak signal to noise ratio (calculated by the example Peak Signal to Noise Ratio identifier 251), a structural similarity value (calculated by the structural similarity identifier 252), and a normalized correlation value (calculated by the example normalized correlation identifier 253). The example cross-entropy calculator 254 calculates a cross-entropy loss using the results of the discriminator 240. An example approach for calculating the cross-entropy loss is disclosed below in connection with FIG. 4 (see Equations 6 and 7).

The example discriminative model trainer 260 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example discriminative model trainer 260 trains the discriminative model stored in the example discriminative model data store 245. In examples disclosed herein, a stochastic gradient descent (SGD) approach is used to train the discriminative model. However, any other approach to training a model may additionally or alternatively be used.

The example generative model trainer 270 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example generative model trainer 270 trains the generative model stored in the example generative model data store 212. In examples disclosed herein, a stochastic gradient descent (SGD) approach is used to train the generative model. However, any other approach to training a model may additionally or alternatively be used.

The example model provider 280 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example model provider 280 provides the generated 3D model stored in the 3D model data store 215 to an external entity (e.g., a remote server, a user, a storage device, etc.). In examples disclosed herein, the 3D model is provided as a response to a request to create the 3D model based on provided video data.

While an example manner of implementing the example 3D model creator 200 is illustrated in FIG. 2, one or more of the elements, processes and/or devices illustrated in FIG. 2 may be combined, divided, re-arranged, omitted, eliminated and/or implemented in any other way. Further, the example video data accessor 205, the example 3D model generator 210, the example generative model data store 212, the example 3D model data store 215, the example camera position identifier 220, the example image simulator 230, the example image selector 235, the example discriminator 240, the example discriminative model data store 245, the example loss identifier 250, the example Peak Signal to Noise Ratio identifier 251, the example structural similarity identifier 252, the example normalized correlation identifier 253, the example cross-entropy calculator 254, the example discriminative model trainer 260, the example generative model trainer 270, the example model provider 280, and/or, more generally, the example 3D model creator 200 of FIG. 2 may be implemented by hardware, software, firmware and/or any combination of hardware, software and/or firmware. Thus, for example, any of the example video data accessor 205, the example 3D model generator 210, the example generative model data store 212, the example 3D model data store 215, the example camera position identifier 220, the example image simulator 230, the example image selector 235, the example discriminator 240, the example discriminative model data store 245, the example loss identifier 250, the example Peak Signal to Noise Ratio identifier 251, the example structural similarity identifier 252, the example normalized correlation identifier 253, the example cross-entropy calculator 254, the example discriminative model trainer 260, the example generative model trainer 270, the example model provider 280, and/or, more generally, the example 3D model creator 200 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example video data accessor 205, the example 3D model generator 210, the example generative model data store 212, the example 3D model data store 215, the example camera position identifier 220, the example image simulator 230, the example image selector 235, the example discriminator 240, the example discriminative model data store 245, the example loss identifier 250, the example Peak Signal to Noise Ratio identifier 251, the example structural similarity identifier 252, the example normalized correlation identifier 253, the example cross-entropy calculator 254, the example discriminative model trainer 260, the example generative model trainer 270, the example model provider 280, and/or, more generally, the example 3D model creator 200 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example 3D model creator 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
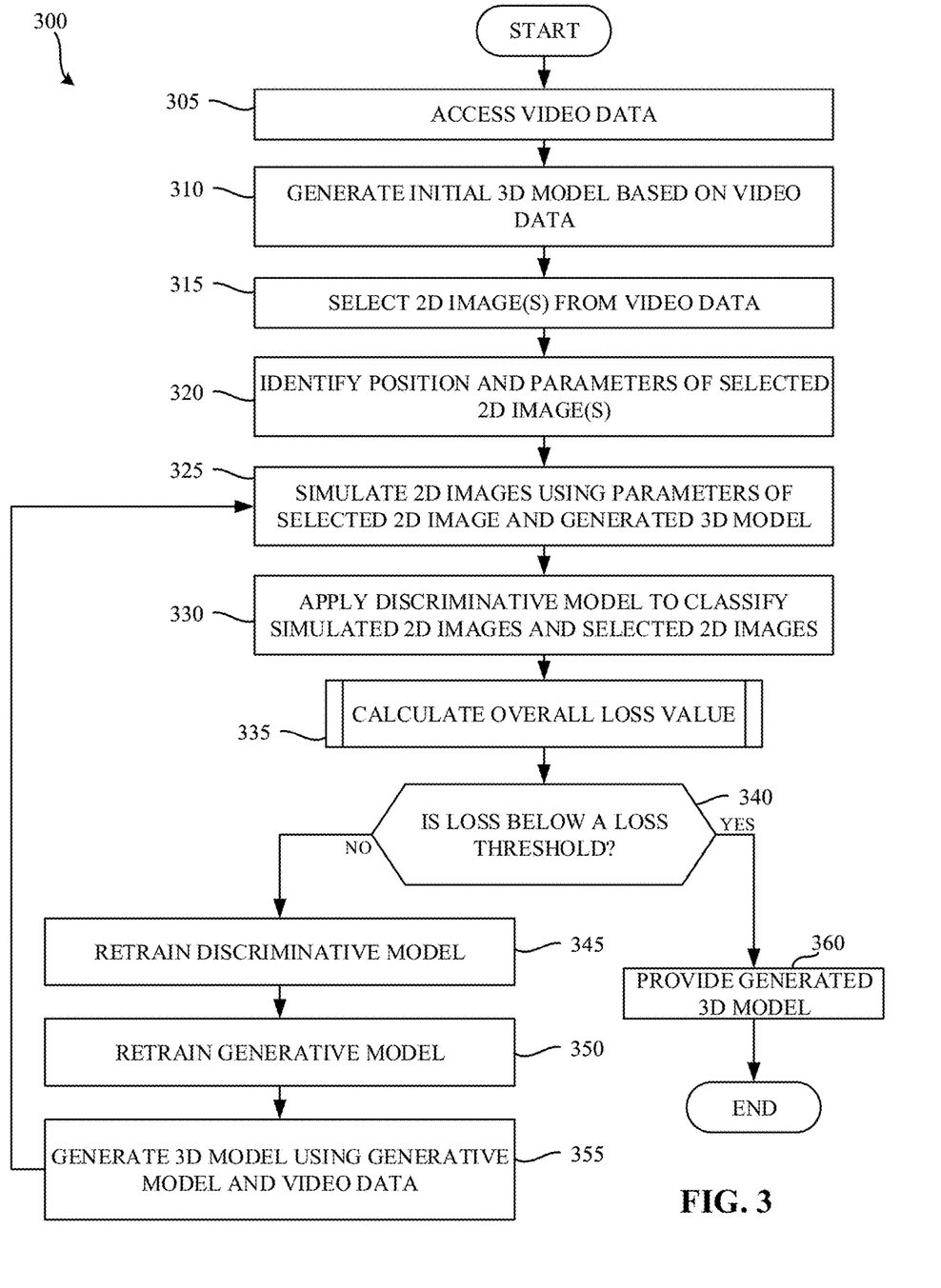
FIG. 3 is a flowchart representative of machine-readable instructions which may be executed to implement the example 3D model creator to create a 3D model.

Flowcharts representative of example hardware logic or machine readable instructions for implementing the 3D model creator 200 of FIG. 2 are shown in FIGS. 3 and/or 4. The machine readable instructions may be an executable computer program or portion of an executable computer program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3 and/or 4, many other methods of implementing the example 3D model creator 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 4:
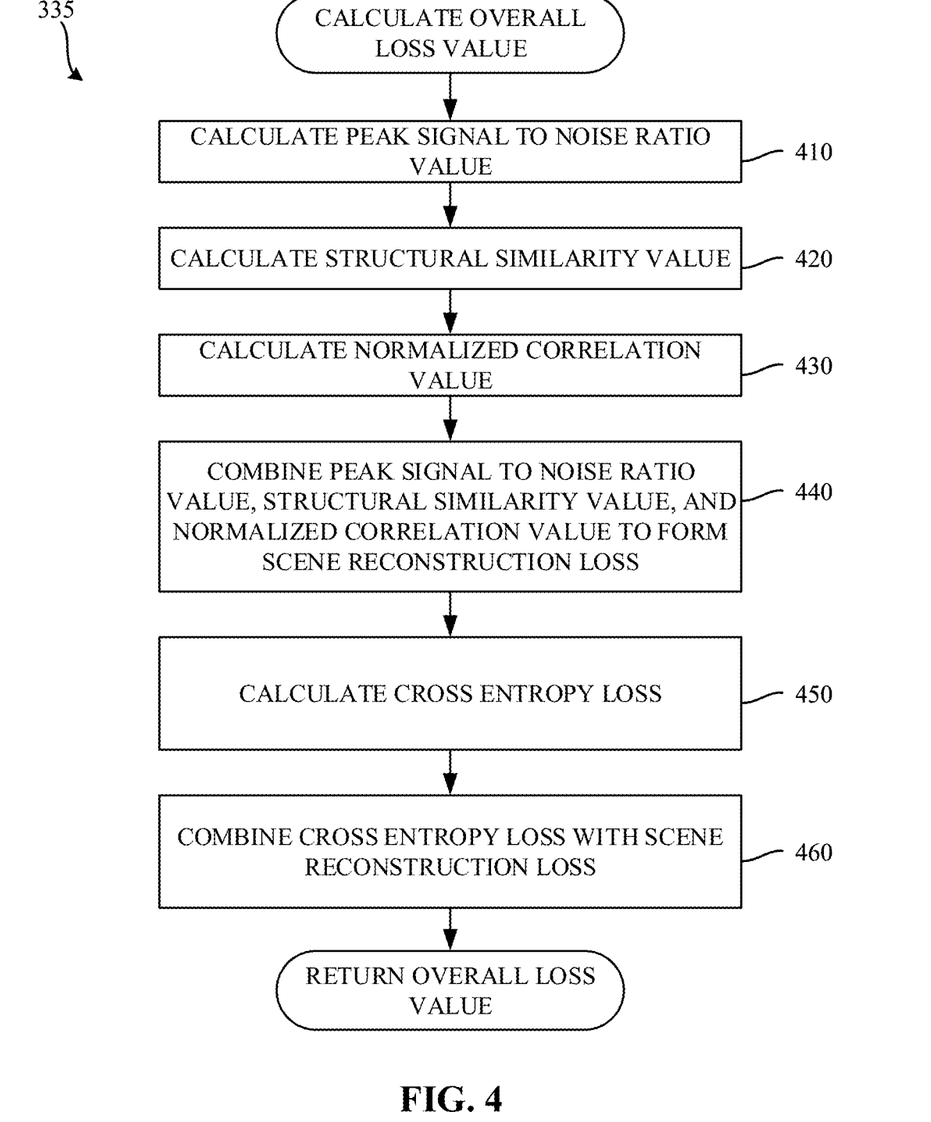
FIG. 4 is a flowchart representative of machine-readable instructions which may be executed to implement the example 3D model creator to calculate an overall loss value used in the process of creating a 3D model.

As mentioned above, the example processes of FIGS. 3 and/or 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 3 is a flowchart representative of machine-readable instructions which may be executed to implement the example 3D model creator 200 to create a 3D model. The example process 300 of the illustrated example of FIG. 3 begins when the example video data accessor 205 accesses video data of a real-world scene. (Block 305). In examples disclosed herein, the real-world scene may include any items and/or objects such as, for example, buildings, vehicles, roads, trees, people, animals, etc. In examples disclosed herein, the video data accessor 205 provides the video data to the 3D model generator 210. However, in some examples, the video data accessor 205 stores the video data in a memory of the example 3D model creator 200 (e.g., in the 3D model data store 205). The example 3D model generator 210 generates an initial 3D model based on the video data. (Block 310). In some examples, the initial 3D model is generated using the generative model stored in the generative model data store 312. In some examples, an initial training of the generative model may be performed prior to the use of the generative model to generate the initial 3D model. However, in some other examples, the generative model used for the creation of the initial 3D model may be performed using an untrained generative model. In examples disclosed herein, the example 3D model generator 210 stores the 3D model in the 3D model data store 215.

The example image selector 235 selects 2D images from the video data that are to be used to evaluate the 3D model. (Block 315). In examples disclosed herein, each frame of video data is selected. However, in some examples, fewer than all of the frames may be selected. The example camera position identifier 220 identifies positions and/or other parameters of the selected 2D image(s). (Block 320). In examples disclosed herein, the positions and/or other parameters are provided to the image simulator 230. The image simulator 230 implements a virtual camera that is movable within the 3D model and can be controlled to match the optical parameters of the camera used to capture the real-world images. The example image simulator 230 simulates 2D image(s) using the parameters of the selected image(s). (Block 325).

The example discriminator 240 utilizes the discriminative model stored in the discriminative model data store 245 to classify each of the simulated 2D images and the selected 2D images as either real or simulated. (Block 330). In some examples, an initial training of the discriminative model may be performed prior to the use of the discriminative model. By performing such an initial training, a first iteration of the use of the discriminative model by the discriminator 240 is based on a trained version of the discriminative model (thereby producing more accurate classification results in the first iteration of the process of blocks 325 through 355). In some other examples, the discriminative model used for the first iteration of the classification of Block 330 may be performed using an untrained discriminative model. In examples disclosed herein, the discriminator 240 provides a probability that a given image is real or simulated. When the probability for the image is both 50% simulated and 50% real (or each probability is within a threshold range such as, for example 48%-52%), the discriminator is not able to discern whether a given image is real or simulated.

Using the results of the discriminator and/or differences identified between the simulated and real images, the example loss identifier 250 determines an amount of loss. (Block 335). An example approach for calculating an amount of loss is disclosed below in connection with FIG. 4.

The example model provider 280 determines whether the amount of loss calculated by the loss identifier 250 is below a loss threshold. (Block 340). When the amount of loss is below a loss threshold, the 3D model generated by the 3D model generator 210 is considered to be high quality. In examples disclosed herein, if the example model provider 280 determines that the loss calculated by the loss identifier 250 is not below the loss threshold (e.g., block 340 returns a result of NO), the example discriminative model trainer 260 re-trains the discriminative model (e.g., iteratively fine tunes the discriminative model) stored in the example discriminative model data store 245. (Block 345). In examples disclosed herein, the re-training utilizes the prior state of the discriminative model as a starting point, instead of starting training from an un-initialized model. In examples disclosed herein, the discriminative model is re-trained using the simulated 2D images and the selected 2D images, and indications of whether those images are real or simulated.

The example generative model trainer 270 re-trains the generative model (e.g., iteratively fine tunes the generative model) stored in the generative model data store 212. (Block 350). In examples disclosed herein, the re-training utilizes the prior state of the generative model as a starting point, instead of starting training from an un-initialized model. In examples disclosed herein, the generative model is re-trained in view of the error identified by the discriminative model. The example 3D model generator 210 then generates a new 3D model using the generative model stored in the generative model data store 212 and the video data. (Block 335).

Control then proceeds to block 325 where simulated 2D images are generated using the new 3D model. Blocks 325 through 355 are repeated until the example model provider 280 determines that the amount of loss calculated by the loss identifier 250 is below a loss threshold. (Block 340 returns a result of YES). When, for example, the amount of loss is below the loss threshold, the 3D model has been generated using the generative model and discriminative model to the point that (1) the discriminator 240 cannot differentiate between simulated images from the 3D model and their real counterparts, and (2) the simulated images and the real images differ by less than a threshold amount. In response to the example model provider 280 determining that the amount of loss calculated by the loss identifier 250 is below a loss threshold, the example model provider 280 provides the generated 3D model as an output. (Block 360).

FIG. 4 is a flowchart representative of machine-readable instructions which may be executed to implement the example 3D model creator to calculate an overall loss value used in the process of creating a 3D model. In total, the overall loss function of the illustrated example of FIG. 4 includes two components: a scene reconstruction loss $L_{Reconstruction}$ and a cross-entropy loss $L_{CrossEntropy}$. The overall loss function can thus be represented as shown in Equation 1, below.

$$L_{Overall} = L_{Reconstruction} + \lambda L_{CrossEntropy} \qquad \text{Equation 1}$$

In Equation 1, $\lambda$ is a parameter that can be used to adjust the percentages between the scene reconstruction loss and cross-entropy loss.

The scene reconstruction loss is computed based on the image pairs provided to the discriminator 240. In examples disclosed herein, three quantitative image effect indicators are applied to measure the differences between those images. However, any other approach to quantifying an amount of difference between pairs of images may additionally or alternatively be used.

The example Peak Signal to Noise Ratio identifier 251 of the example loss identifier 250 calculates a Peak Signal to Noise Ratio (PSNR) value to assess the effect of difference from the gray-level fidelity. (Block 410). PSNR represents a ratio between a maximum possible power of an image and the power of corrupting noise that affects the fidelity of the representation of the image. Equation 2, below, illustrates an example approach for calculating a PSNR value:

$$PSNR(x, y) = 10\log_{10}\left(\frac{(MAX_I)^2}{MSE(x, y)}\right) \qquad \text{Equation 2}$$

In Equation 2, x and y represent the two images being compared (e.g., the images in the real and simulated image pair). MSE represents the mean squared error, and $MAX_I$ represents the maximum possible pixel value of the given image.

The example structural similarity identifier 252 of the example loss identifier 250 calculates a Structural Similarity (SSIM) value representing a similarity between two images. (Block 420). An example approach for calculating the SSIM value is shown in Equation 3, below.

$$SSIM(x, y) = \frac{(2\mu_x\mu_y + C_1)(2\sigma_{xy} + C_2)}{(\mu_x^2 + \mu_y^2 + C_1)(\sigma_x^2 + \sigma_y^2 + C_2)} \quad \text{Equation 3}$$

In Equation 3, above, $\mu_x$ represents the average value of the image x, $\mu_y$ represents the average value of the image y, $\sigma_x^2$ represents the variance of the image x, $\sigma_y^2$ represents the variance of the image y, and $\sigma_{xy}$ represents the covariance of x and y. $C_1$ and $C_2$ are variables used to stabilize the division occurring in Equation 3.

The example normalized correlation identifier 253 of the example loss identifier 250 calculates a Normalized Correlation (NC) value indicator that represents a similarity between the same dimension vectors. An example approach for computing the normalized correlation value is shown below in Equation 4.

$$NC(x, y) = \frac{x \cdot y}{\|x\|\|y\|} \quad \text{Equation 4}$$

In Equation 4, above, x and y represent the two images being compared (e.g., the images in the real and simulated image pair).

The example loss identifier 250 combines the PSNR value, the SSIM value, and the NC value to form the total reconstruction error value. (Block 440). An example approach to combining the PSNR value, the SSIM value, and the NC value is shown in Equation 5, below:

$$L_{Reconstruction} = \sum_{j=1}^{N_{Scene}} \left\{ \begin{array}{l} \alpha \cdot \left[1 - E_{Sigmoid}\left(PSNR_{G_jF_j}\right)\right] + \\ \beta \cdot \left(1 - SSIM_{G_jF_j}\right) + \\ \gamma \cdot \left(1 - NC_{G_jF_j}\right) \end{array} \right\} \quad \text{Equation 5}$$

In Equation 5, above, $\alpha$, $\beta$, $\gamma$ are parameters to adjust the percentages among the loss values from PSNR, SSIM and NC values. The subscript $G_jF_j$ represents the pair of ground truth and simulated images. The symbol $N_{Scene}$ represents the total count of 2D scene image pairs.

The example cross-entropy calculator 254 calculates a cross-entropy loss. (Block 450). In examples disclosed herein, a Wasserstein GAN (WGAN) is used in connection with the discriminative model and generative model training process. The target of training the generative network G and discriminative network D is shown in Equation 6, below:

$$\min_G \max_D \mathbb{E}_{x \sim \mathbb{P}_r}[D(x)] - \mathbb{E}_{\tilde{x} \sim \mathbb{P}_g}[D(\tilde{x})] \quad \text{Equation 6}$$

In Equation 6, above, $\mathbb{P}_r$ is a real scene images distribution and $\mathbb{P}_g$ is a generated scene images distribution. $\tilde{x}$ is implicitly generated by generative network G. For the raw WGAN training process, weight clipping results in optimization difficulties including, for example, capacity underuse, gradient explosion, vanishing gradients, etc. In examples disclosed herein, a gradient penalty is used. Thus, the cross-entropy loss is calculated by the example cross-entropy calculator 254 using Equation 7, below:

$$L_{CrossEntropy} = \quad \text{Equation 7}$$
$$\mathbb{E}_{x \sim \mathbb{P}_r}[D(x)] - \mathbb{E}_{\tilde{x} \sim \mathbb{P}_g}[D(\tilde{x})] - \theta \mathbb{E}_{\hat{x} \sim \mathbb{P}_{\hat{x}}}[(\|\nabla_{\hat{x}} D(\hat{x})\|_2 - 1)^2]$$

In Equation 7, above, $\theta$ is a parameter used to adjust the percentage of gradient penalty in the cross-entropy loss. $\mathbb{P}_{\hat{x}}$ is implicitly defined as the dataset which is uniformly sampled along straight lines between pairs of points come from $\mathbb{P}_r$ and $\mathbb{P}_g$ distributions. The value of this cross-entropy loss can quantitatively represent the error present in the generative/discriminative training process.

The example loss identifier 250 combines the reconstruction loss $L_{Reconstruction}$ and the cross-entropy loss $L_{CrossEntropy}$. (Block 460). In examples disclosed herein, the overall loss is computed as shown in Equation 8, below.

$$L_{Overall} = L_{Reconstruction} + \lambda L_{CrossEntropy} \quad \text{Equation 8}$$

In Equation 8, $\lambda$ is a parameter that can be used to adjust the percentages between the scene reconstruction loss and cross-entropy loss. The example loss value is then returned as a result of block 335 and is used to determine whether an acceptable amount of loss (e.g., convergence) has been reached. (Block 340 of FIG. 3).

Figure 5:
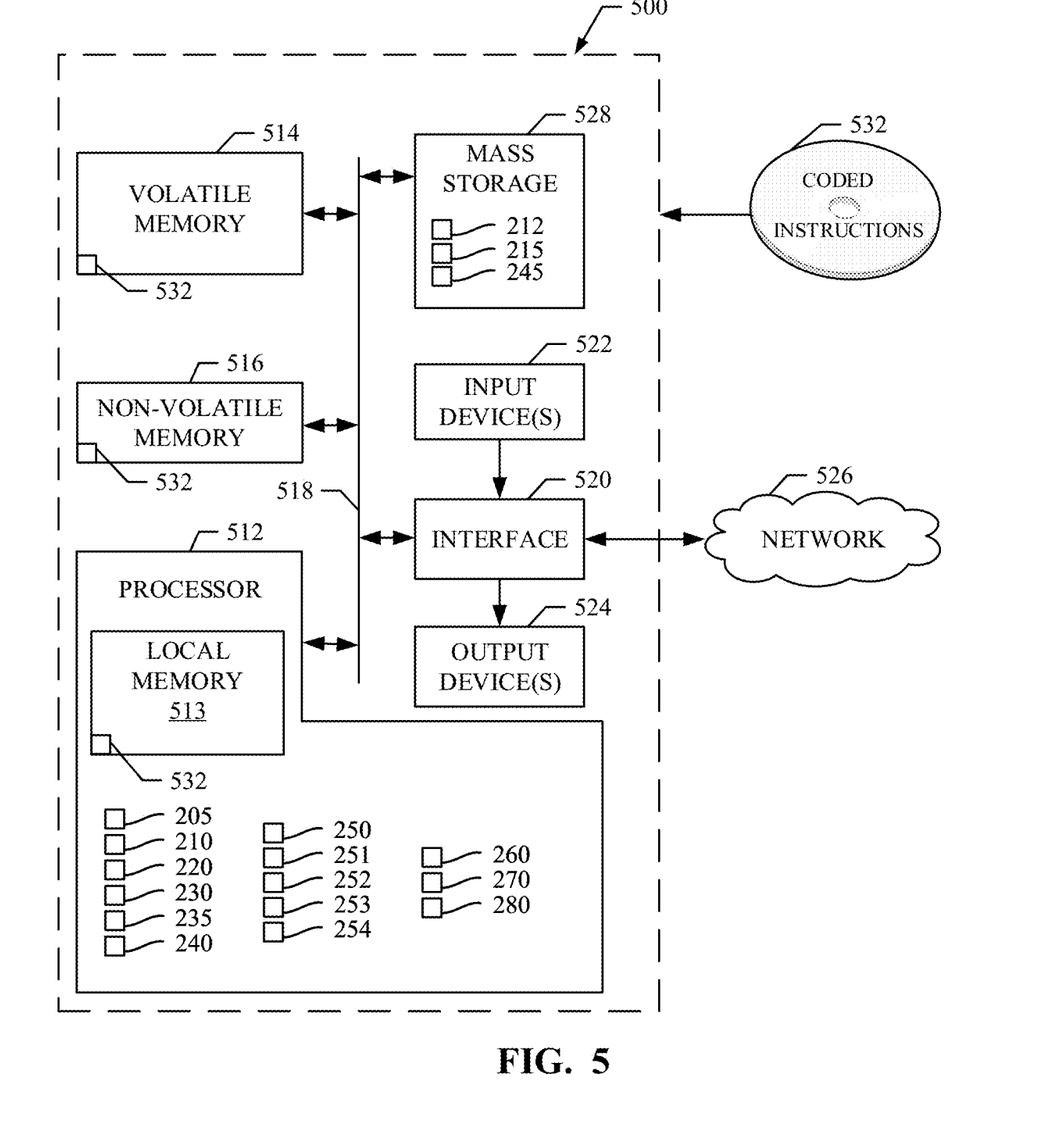
FIG. 5 is a block diagram of an example processor platform structured to execute the instructions of FIGS. 3 and/or 4 to implement the 3D model creator of FIG. 2.

FIG. 5 is a block diagram of an example processor platform 500 structured to execute the instructions of FIGS. 3 and/or 4 to implement the example 3D model creator 200 of FIG. 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example video data accessor 205, the example 3D model generator 210, the example camera position identifier 220, the example image simulator 230, the example image selector 235, the example discriminator 240, the example loss identifier 250, the example Peak Signal to Noise Ratio identifier 251, the example structural similarity identifier 252, the example normalized correlation identifier 253, the example cross-entropy calculator 254, the example discriminative model trainer 260, the example generative model trainer 270, the example model provider 280.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives. In the illustrated example of FIG. 5, the example mass storage devices 528 implements the example generative model data store 212, the example 3D model data store 215, and the example discriminative model data store 245.

The machine executable instructions 532 of FIGS. 3 and/or 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that enable creation of a 3D model based on video data. Example approaches disclosed herein, as compared to existing approaches for creating a 3D model, result in more accurate models. For example, using a similar data set such as, for example, an Imperial College of London and National University of Ireland Maynooth (ICL-NUIM) dataset, example approaches disclosed herein result in superior scene reconstructions, as compared to other approaches. Table 1, below, shows balanced rank estimation (BRE) scores in a range of −1 to +1 for different combinations of scenes and reconstruction approaches. Scores closer to +1 indicate a reconstructed scene that has less relative difference between the reconstructed scene and the real 3D scene.

TABLE 1

|  | Visual-SFM | SUN3D-SFM | Kintinuous | DVO-SLAM | RRoIS | ElasticFusion | Approaches disclosed herein |
| --- | --- | --- | --- | --- | --- | --- | --- |
| Living Room 1 | −0.13 | 0.02 | −0.53 | −0.90 | 0.47 | −0.33 | 0.62 |
| Living Room 2 | −0.27 | −0.13 | −0.89 | −0.65 | 0.66 | −0.67 | 0.80 |
| Living Room 1 | −0.34 | −0.17 | −0.93 | −0.68 | 0.63 | −0.70 | 0.77 |
| Living Room 2 | −0.19 | −0.06 | −0.72 | −0.79 | 0.55 | −0.54 | 0.71 |
| Office Room 1 | −0.29 | −0.15 | −0.71 | −0.41 | 0.09 | −0.51 | 0.29 |
| Office Room 2 | −0.27 | −0.11 | −0.83 | −0.57 | 0.58 | −0.61 | 0.76 |
| Office Room 3 | −0.32 | −0.16 | −0.87 | −0.59 | 0.60 | −0.63 | 0.82 |
| Office Room 4 | −0.26 | −0.12 | −0.76 | −0.48 | 0.23 | −0.57 | 0.46 |

The columns of Table 1, above represent different scene reconstruction approaches including, for example, a Visual-SFM approach, a SUN3D-SFM approach, a Kintinuous approach, a DVO-SLAM approach, a RRoIS approach, an ElasticFusion approach, and the example approaches disclosed herein. The rows of Table 1, represent different scenes in the example ICL-NUIM data set, and each of the cells represent BRE scores for the corresponding scene and reconstruction approach. As shown in Table 1, BRE scores for the example approaches disclosed herein result in models that are more accurate than other approaches.

Example 1 includes an apparatus for generating a three-dimensional (3D) model for digital image scene reconstruction, the apparatus comprising a 3D scene generator to generate a 3D model for digital image scene reconstruction based on a trained generative model and a digital image captured in a real environment, an image simulator to generate a simulated image based on the 3D model, the simulated image corresponding to the captured image, and a discriminator to apply a discriminative model to the simulated image to determine whether the simulated image is simulated.

Example 2 includes the apparatus of example 1, further including a loss identifier to calculate a loss value based on differences between the simulated image and the captured image, the loss value based on whether the discriminator correctly determined that the simulated image is a simulated image, a generative model trainer to, in response to the loss value not satisfying a loss threshold, train the generative model, and a discriminative model trainer to, in response to the loss value not satisfying the loss threshold, train the discriminative model.

Example 3 includes the apparatus of example 2, further including a peak signal to noise ratio identifier to calculate a peak signal to noise ratio between the simulated image and the captured image, the loss value based on the peak signal to noise ratio.

Example 4 includes the apparatus of example 2, further including a structural similarity identifier to calculate a structural similarity value between the simulated image and the captured image, the loss value based on the structural similarity value.

Example 5 includes the apparatus of example 2, further including a normalized correlation identifier to calculate a normalized correlation value between the simulated image and the captured image, the loss value based on the normalized correlation value.

Example 6 includes the apparatus of example 2, wherein the 3D scene generator is further to, in response to the training of the generative model, generate the 3D model based on the trained generative model and a plurality of captured images.

Example 7 includes the apparatus of any one of examples 1 through 6, further including a camera position identifier to identify a position within the 3D model for the captured image, the image simulator to generate the simulated image based on the identified position within the 3D model.

Example 8 includes at least one non-transitory machine-readable medium comprising instructions which, when executed, cause a machine to at least generate a three-dimensional (3D) model for digital image scene reconstruction based on a trained generative model and a digital image captured in a real environment, generate a simulated image based on the 3D model, the simulated image corresponding the captured image, and apply a discriminative model to identify the simulated image as either real or simulated.

Example 9 includes the at least one machine-readable storage medium of example 8, wherein the instructions, when executed, further cause the machine to at least calculate a loss value based on differences between the simulated image and the captured image, the loss value based on whether the discriminative model correctly identified the simulated image as either real or simulated, and in response to the loss value not satisfying a loss threshold, train the discriminative model and the generative model.

Example 10 includes the at least one machine-readable storage medium of example 9, wherein the loss value is based on a peak signal to noise ratio between the simulated image and the captured image.

Example 11 includes the at least one machine-readable storage medium of example 9, wherein the loss value is based on a structural similarity value between the simulated image and the captured image.

Example 12 includes the at least one machine-readable storage medium of example 9, wherein the loss value is based on a normalized correlation value between the simulated image and the captured image.

Example 13 includes the at least one machine-readable storage medium of example 9, wherein the instructions, when executed, further cause the machine to, in response to the training of the generative model, generate the 3D model based on the generative model and a plurality of captured images.

Example 14 includes the at least one machine-readable storage medium of example 8, wherein the instructions, when executed, further cause the machine to identify a position within the 3D model for the captured image, the generating of the simulated image based on the identified position within the 3D model.

Example 15 includes a method for generating a three-dimensional (3D) model for digital image scene reconstruction, the method comprising generating the 3D model of a real environment based on a generative model and a captured image of the real environment, generating a simulated image based on the 3D model, the simulated image corresponding the captured image, applying a discriminative model to determine whether the simulated image is real or simulated.

Example 16 includes the method of example 15, further including calculating a loss value based on differences between the simulated image and the captured image, the loss value based on whether the simulated image was correctly determined to be a simulated image, and in response to the loss value not satisfying a loss threshold, training the discriminative model and the generative model.

Example 17 includes the method of example 16, wherein the loss value is based on a peak signal to noise ratio between the simulated image and the captured image.

Example 18 includes the method of example 16, wherein the loss value is based on a structural similarity value between the simulated image and the captured image.

Example 19 includes the method of example 16, wherein the loss value is based on a normalized correlation value between the simulated image and the captured image.

Example 20 includes the method of example 16, further including, in response to the training of the generative model, generating the 3D model based on a plurality of captured images.

Example 21 includes the method of any one of examples 15 through 20, further including identifying a position within the 3D model for the captured image, the generating of the simulated image based on the identified position within the 3D model.

Example 22 includes an apparatus for generating a three-dimensional (3D) model for digital image scene reconstruction, the apparatus comprising means for generating a 3D model of a real environment based on a generative model and a captured image of the real environment, means for simulating an image based on the 3D model, the simulated image corresponding to the captured image, and means for applying a discriminative model to determine whether the simulated image is either captured or simulated.

Example 23 includes the apparatus of example 22, further including means for calculating a loss value based on differences between the simulated image and the captured image, the loss value based on whether the means for applying correctly determined that the simulated image is either captured or simulated, first means for training, in response to the loss value not satisfying a loss threshold, the generative model, and second means for training, in response to the loss value not satisfying the loss threshold, the discriminative model.

Example 24 includes the apparatus of example 23, wherein the means for calculating is further to calculate a peak signal to noise ratio between the simulated image and the captured image, the loss value based on the peak signal to noise ratio.

Example 25 includes the apparatus of example 23, wherein the means for calculating is further to calculate a structural similarity value between the simulated image and the captured image, the loss value based on the structural similarity value.

Example 26 includes the apparatus of example 23, wherein the means for calculating is further to calculate a normalized correlation value between the simulated image and the captured image, the loss value based on the normalized correlation value.

Example 27 includes the apparatus of example 23, further including, wherein the means for generating is further to, in response to the training of the generative model, generate the 3D model based on the trained generative model and a plurality of captured images.

Example 28 includes the apparatus of example 22, further including means for identifying a position within the 3D model for the captured image, the image simulator to generate the simulated image based on the identified position within the 3D model.

Example 29 includes the apparatus of any one of examples 23 through 27, further including means for providing, in response to the loss value satisfying the loss threshold, the 3D model.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for generating a three-dimensional (3D) model for digital image scene reconstruction, the apparatus comprising:
   a 3D scene generator to generate a 3D model for digital image scene reconstruction based on a trained generative model and a plurality of digital images captured in a real environment;
   a camera position identifier to identify camera positions within the 3D model for the captured digital images;
   an image simulator to generate a plurality of simulated images based on the 3D model and the identified camera positions within the 3D model, each one of respective ones of the simulated images corresponding to a respective one of the captured digital images;
   a discriminator to apply a discriminative model to the respective ones of the simulated images and the corresponding respective ones of the captured digital images to classify the respective ones of the simulated images and the corresponding respective ones of the captured digital images as either generated by the image simulator or captured in the real environment; and
   a loss identifier to calculate an overall loss value based on a scene reconstruction loss value in combination with a cross-entropy loss value, the scene reconstruction loss value calculated based on differences between pairs of the respective ones of the simulated images and the corresponding respective ones of the captured digital images, the cross-entropy loss value calculated based on whether the discriminator is able to correctly classify the respective ones of the simulated images and the corresponding respective ones of the captured digital images.

2. The apparatus of claim 1, further including:
   a generative model trainer to, in response to the overall loss value not satisfying a loss threshold, train the generative model; and
   a discriminative model trainer to, in response to the overall loss value not satisfying the loss threshold, train the discriminative model.

3. The apparatus of claim 2, further including a peak signal to noise ratio identifier to calculate peak signal to noise ratios between the pairs of the respective ones of the simulated images and the corresponding respective ones of the captured digital images, the scene reconstruction loss value based on the peak signal to noise ratios.

4. The apparatus of claim 2, further including a structural similarity identifier to calculate structural similarity values between the pairs of the respective ones of the simulated images and the corresponding respective ones of the captured digital images, the scene reconstruction loss value based on the structural similarity values.

5. The apparatus of claim 2, further including a normalized correlation identifier to calculate normalized correlation values between the pairs of the respective ones of the simulated images and the corresponding respective ones of the captured digital images, the scene reconstruction loss value based on the normalized correlation values.

6. The apparatus of claim 2, wherein the 3D scene generator is further to, in response to the training of the generative model, generate the 3D model based on the trained generative model and the plurality of captured digital images.

7. At least one non-transitory machine-readable storage medium comprising instructions which, when executed, cause a machine to at least:
   generate a three-dimensional (3D) model for digital image scene reconstruction based on a trained generative model and a plurality of digital images captured in a real environment;
   identify camera positions within the 3D model for the captured digital images;
   generate a plurality of simulated images based on the 3D model and the identified camera positions within the 3D model, each one of respective ones of the simulated images corresponding to a respective one of the captured digital images;
   apply a discriminative model to the respective ones of the simulated images and the corresponding respective ones of the captured digital images to classify the respective ones of the simulated images and the corresponding respective ones of the captured digital images as either having been generated based on the 3D model or captured in the real environment; and
   calculate an overall loss value based on a scene reconstruction loss value in combination with a cross-entropy loss value, the scene reconstruction loss value calculated based on differences between pairs of the respective ones of the simulated images and the corresponding respective ones of the captured digital images, the cross-entropy loss value calculated based on whether the application of the discriminative model is able to correctly classify the respective ones of the simulated images and the corresponding respective ones of the captured digital images.

8. The at least one machine-readable storage medium of claim 7, wherein the instructions, when executed, further cause the machine to at least, in response to the overall loss value not satisfying a loss threshold, train the discriminative model and the generative model.

9. The at least one machine-readable storage medium of claim 8, wherein the scene reconstruction loss value is based on peak signal to noise ratios between pairs of the respective ones of the simulated images and the corresponding respective ones of the captured digital images.

10. The at least one machine-readable storage medium of claim 8, wherein the scene reconstruction loss value is based on structural similarity values between pairs of the respective ones of the simulated images and the corresponding respective ones of the captured digital images.

11. The at least one machine-readable storage medium of claim 8, wherein the scene reconstruction loss value is based on normalized correlation values between pairs of the respective ones of the simulated images and the corresponding respective ones of the captured digital images.

12. The at least one machine-readable storage medium of claim 8, wherein the instructions, when executed, further cause the machine to, in response to the training of the generative model, generate the 3D model based on the trained generative model and the plurality of captured digital images.

13. A method for generating a three-dimensional (3D) model for digital image scene reconstruction, the method comprising:
  generating the 3D model of a real environment based on a generative model and a plurality of digital images captured in the real environment;
  identifying camera positions within the 3D model for the captured digital images;
  generating a plurality of simulated images based on the 3D model and the identified camera position within the 3D model, each of respective ones of the simulated images corresponding to a respective one of the captured digital images;
  applying a discriminative model to the respective ones of the simulated images and the corresponding respective ones of the captured digital images to classify the respective ones of the simulated images and the corresponding respective ones of the captured digital images as either having been generated based on the 3D model or captured in the real environment; and
  calculating an overall loss value based on a scene reconstruction loss value in combination with a cross-entropy loss value, the scene reconstruction loss value calculated based on differences between pairs of the respective ones of the simulated images and the corresponding respective ones of the captured digital images, the cross-entropy loss value calculated based on whether the application of the discriminative model is able to correctly classify the respective ones of the simulated images and the corresponding respective ones of the captured digital images.

14. The method of claim 13, further including in response to the overall loss value not satisfying a loss threshold, training the discriminative model and the generative model.

15. The method of claim 14, wherein the scene reconstruction loss value is based on peak signal to noise ratios between pairs of the respective ones of the simulated images and the corresponding respective ones of the captured digital images.

16. The method of claim 14, wherein the scene reconstruction loss value is based on structural similarity values between pairs of the respective ones of the simulated images and the corresponding respective ones of the captured digital images.

17. The method of claim 14, wherein the scene reconstruction loss value is based on normalized correlation values between pairs of the respective ones of the simulated images and the corresponding respective ones of the captured digital images.

18. The method of claim 14, further including, in response to the training of the generative model, generating the 3D model based on the plurality of captured digital images.

19. An apparatus for generating a three-dimensional (3D) model for digital image scene reconstruction, the apparatus comprising:
  means for generating a 3D model of a real environment based on a generative model and a plurality of captured digital images of the real environment;
  means for identifying camera positions within the 3D model for the captured digital images;
  means for simulating images based on the 3D model and the camera positions within the 3D model, each one of respective ones of the simulated images corresponding to a respective one of the captured digital images;
  means for applying a discriminative model to the respective ones of the simulated images and the corresponding respective ones of the captured digital images to classify the respective ones of the simulated images and the corresponding respective ones of the captured digital images as either having been generated by the means for simulating or captured in the real environment; and
  means for calculating an overall loss value based on a scene reconstruction loss value in combination with a cross-entropy loss value, the scene reconstruction loss value calculated based on differences between pairs of the respective ones of the simulated images and the corresponding respective ones of the captured digital images, the cross-entropy loss value calculated based on whether the means for applying the discriminative model is able to correctly classify the respective ones of the simulated images and the corresponding respective ones of the captured digital images.

20. The apparatus of claim 19, further including:
  first means for training, in response to the overall loss value not satisfying a loss threshold, the generative model; and
  second means for training, in response to the overall loss value not satisfying the loss threshold, the discriminative model.

21. The apparatus of claim 20, wherein the means for calculating is further to calculate peak signal to noise ratios between pairs of the respective ones of the simulated images and the corresponding respective ones of the captured digital images, the scene reconstruction loss value based on the peak signal to noise ratios.

22. The apparatus of claim 20, wherein the means for calculating is further to calculate structural similarity values between pairs of the respective ones of the simulated images and the corresponding respective ones of the captured digital images, the scene reconstruction loss value based on the structural similarity values.

23. An apparatus for generating a three-dimensional (3D) model for digital image scene reconstruction, the apparatus comprising:
  memory;
  instructions in the apparatus; and at least one processor to execute the instructions to cause the at least one processor to at least:

generate a 3D model for digital image scene reconstruction based on a trained generative model and a plurality of digital images captured in a real environment;

identify camera positions within the 3D model for the captured digital images;

generate a plurality of simulated images based on the 3D model and the identified camera positions within the 3D model, each one of respective ones of the simulated images corresponding to a respective one of the captured digital images;

apply a discriminative model to the respective ones of simulated images and to the corresponding respective ones of the captured digital images to classify the respective ones of the simulated images and the corresponding respective ones of the captured digital images as either having been generated based on the 3D model or captured in the real environment; and calculate an overall loss value based on a scene reconstruction loss value in combination with a cross-entropy loss value, the scene reconstruction loss value calculated based on differences between pairs of the respective ones of the simulated images and the corresponding respective ones of the captured digital images, the cross-entropy loss value calculated based on whether the application of the discriminative model is able to correctly classify the respective ones of the simulated images and the corresponding respective ones of the captured digital images.

24. The apparatus of claim 23, wherein the instructions, when executed, cause the at least one processor to at least, in response to the overall loss value not satisfying a loss threshold, train the discriminative model and the generative model.

* * * * *